United States Patent [19]

Kitrell

[11] Patent Number: 4,625,984

[45] Date of Patent: Dec. 2, 1986

[54] FOLDING WHEELCHAIR

[76] Inventor: John V. Kitrell, 4639 Holdrege, Lincoln, Nebr. 68503

[21] Appl. No.: 764,723

[22] Filed: Aug. 12, 1985

[51] Int. Cl.⁴ ........................ B62B 11/00; B62M 1/14

[52] U.S. Cl. ............................ 280/242 WC; 280/250; 280/650; 297/44; 297/417; 297/433; 297/DIG. 4

[58] Field of Search ............... 280/242 WC, 249, 250, 280/289 WC, 647, 648, 649, 650, 657, 658, 642; 297/DIG. 4, 44, 417, 433

[56] References Cited

U.S. PATENT DOCUMENTS

| | | | |
|---|---|---|---|
| 2,181,420 | 11/1939 | Everest | 280/250 |
| 2,621,707 | 12/1952 | Ames | 280/250 |
| 2,649,309 | 8/1953 | Deissner | 280/657 |
| 2,847,058 | 8/1958 | Lee | 280/250 |
| 2,946,602 | 7/1960 | Lee | 280/250 |
| 3,442,532 | 5/1969 | Gardner | 280/250 |
| 3,833,256 | 9/1974 | Dehner | 297/DIG. 4 |
| 3,968,991 | 7/1976 | Maclaren | 280/242 WC |
| 4,101,143 | 7/1978 | Sieber | 280/650 |
| 4,274,651 | 6/1981 | Dumont | 280/242 |
| 4,371,183 | 2/1983 | Dion | 280/650 |
| 4,380,343 | 4/1983 | Lovell | 280/242 |

FOREIGN PATENT DOCUMENTS

| | | | |
|---|---|---|---|
| 2252838 | 6/1975 | France | 297/DIG. 4 |
| 313398 | 8/1969 | Switzerland | 297/44 |
| 2136742 | 4/1983 | United Kingdom | 280/242 WC |

*Primary Examiner*—John J. Love
*Assistant Examiner*—Everett G. Diederiks, Jr.
*Attorney, Agent, or Firm*—Zarley, McKee, Thomte, Voorhees & Sease

[57] ABSTRACT

A folding wheelchair comprising first and second side frames which are hingedly secured together to enable the wheelchair to be moved between folded and operative positions. Drive wheels are located at the lower rearward ends of each of the side frames and are driven by hand wheels rotatably mounted on the side frames. A removable seat is positioned between the side frames and when in position, provides a seating area for the user of the wheelchair and also serves to maintain the wheelchair in its operative position. Folding arm supports and foot supports are also provided.

9 Claims, 8 Drawing Figures

FOLDING WHEELCHAIR

BACKGROUND OF THE INVENTION

This invention relates to a wheelchair and more particularly to a folding wheelchair.

Folding wheelchairs have long been used and generally consist of a pair of side frames connected together by a flexible canvas material to form a seat and backrest when expanded to the open position. The side frames are normally supported by large rear drive wheels mounted on the outside of the side frames with castering wheels to support the front of the assembly. The conventional folding wheelchairs lack maneuverability and stability and are normally less than convenient to use.

It is therefore a principal object of the invention to provide a novel folding wheelchair.

Yet another object of the invention is to provide a folding wheelchair which is provided with a pair of drive wheels located at the lower rearward end of side frames to achieve maximum maneuverability and stability.

Still another object of the invention is to provide a folding wheelchair including a removable molded plastic seat member.

Still another object of the invention is to provide a folding wheelchair including a pair of hand wheels which are connected to the drive wheels to enable the occupant of the wheelchair to conveniently cause the rotation of the drive wheels.

Still another object of the invention is to provide a folding wheelchair which is quickly and easily moved between folded and operative positions.

Still another object of the invention is to provide a folding wheelchair having novel arm and footrest assemblies.

Yet another object of the invention is to provide a folding wheelchair which is economical of manufacture, durable in use and refined in appearance.

These and other objects will be apparent to those skilled in the art.

SUMMARY OF THE INVENTION

A folding wheelchair is described comprising first and second side frames having a generally L-shaped configuration. Each of the side frames comprises a first side frame portion having rearward and forward ends and a second side frame portion extending upwardly from the rearward end of the first side frame portion. A drive wheel is rotatably secured to each of the side frames at the rearward end of the first side frame portions. A caster wheel is also mounted on each of the side frames at the forward end of the first side frame portions. First and second back panels are hingedly secured together and are hingedly secured to the first and second side frames. First and second hinge plates are also hingedly secured to the first side frame portions of the first and second side frames. First and second footrest assemblies are hingedly secured to the first and second hinge plates, respectively and may be moved between foot supporting positions and non-supporting positions. Armrest assemblies are provided on each of the first and second side frames. A removable molded plastic seat is removably mounted on the wheelchair.

DESCRIPTION OF THE PREFERRED EMBODIMENT

Figure 1:
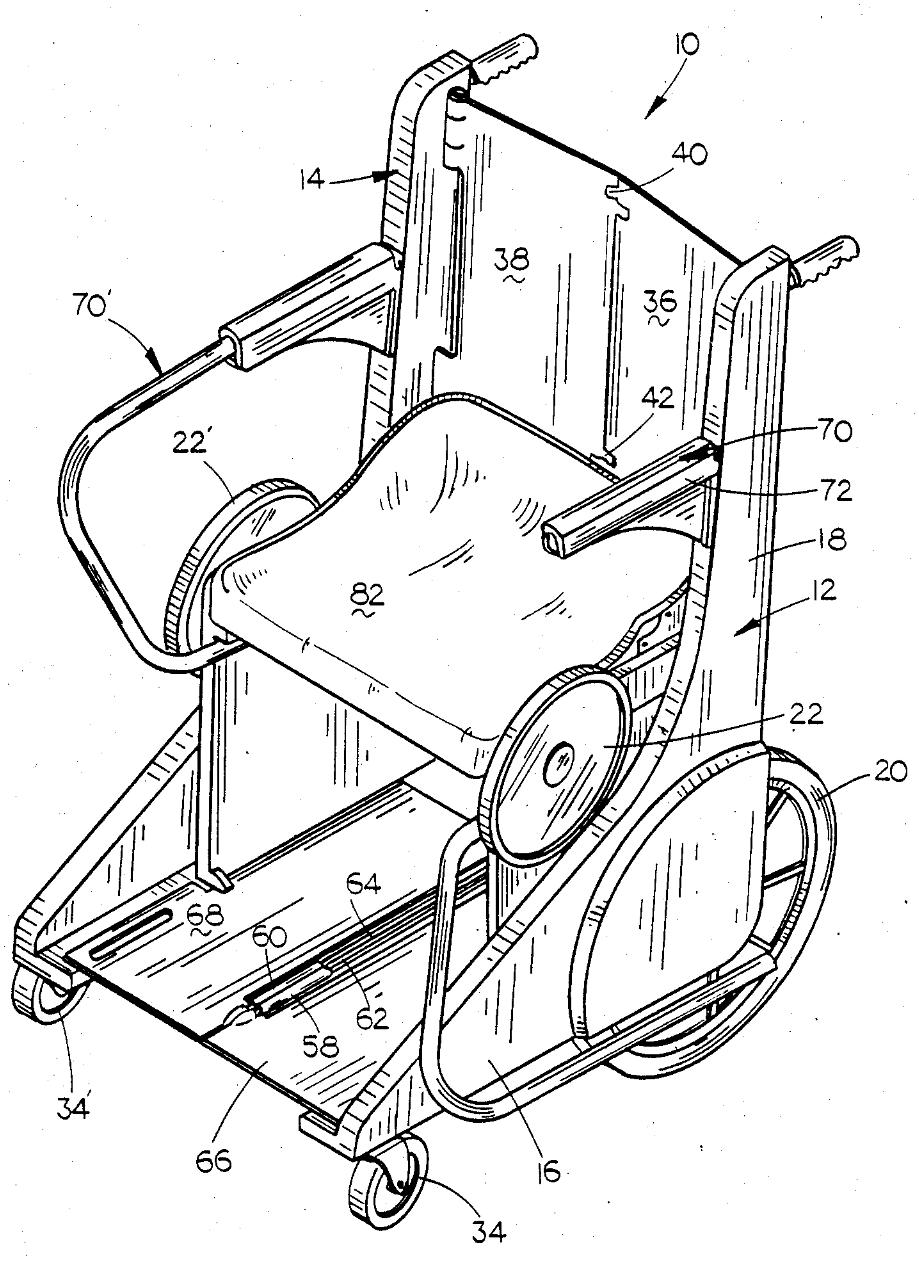
FIG. 1 is a front perspective view of the wheelchair of this invention in its operative position.
Figure 6:
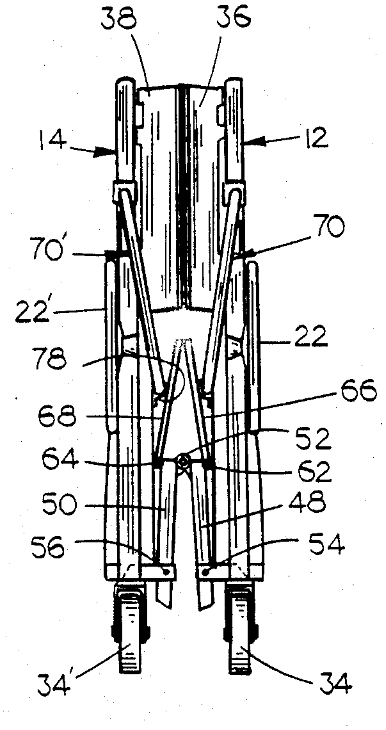
FIG. 6 is a front view of the wheelchair in its folded position.
Figure 7:
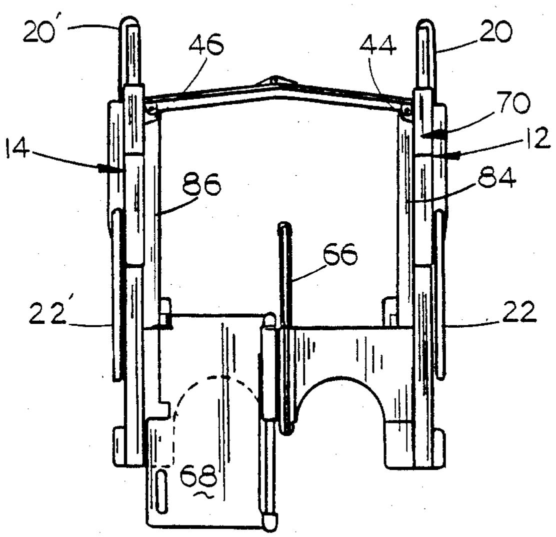
FIG. 7 is a top view of the wheelchair with the seat removed and one of the footrest assemblies pivotally moved to a non-supporting position.
Figure 8:
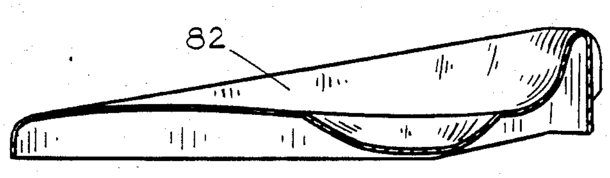
FIG. 8 is a sectional view of the seat of the wheelchair.

The wheelchair of this invention is referred to generally by the reference numeral 10 and is designed to be moved between the operative positions seen in FIG. 1 to the folded positions seen in FIG. 6. Wheelchair 10 comprises side frames 12 and 14 which are hingedly secured together as will be described in more detail hereinafter. Side frame 12 includes a first side frame portion 16 having rearward and forward ends and a second side frame portion 18 which extends upwardly from the rearward end of side frame portion 16. Drive wheel 20 is rotatably mounted on side frame 12 at the rearward end of side frame portion 16 directly below side frame portion 18. In other words, the rotational axis of wheel 20 is located at the convergence of the side frame portions 16 and 18.

Hand wheel 22 is rotatably mounted on side frame 12 and is connected to wheel 20 by means of belt 21 extending around pulleys 24 and 26 so that rotation of wheel 22 will cause the rotation of wheel 20. The numeral 28 refers to a brake assembly including arm 30 which is operatively connected to a brake shoe 32 through a spring-loaded connection 33. Brake shoe 32 is adapted to engage the periphery of wheel 20 to prevent the rotation of wheel 20 when arm 30 is moved to its braking position.

Figure 4:
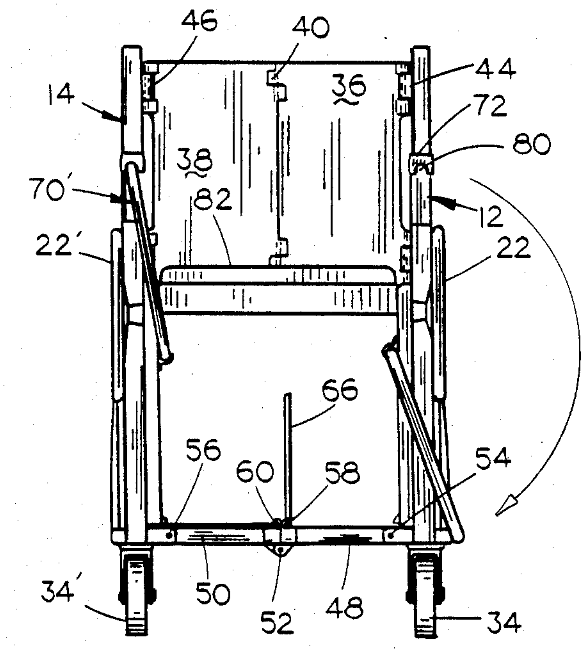
FIG. 4 is a front view of the wheelchair with one of the armrest assemblies pivotally moved downwardly and one of the footrest assemblies pivotally moved upwardly.

Caster wheel 34 is secured to side frame 12 at the lower forward end of side frame portion 16 as seen in the drawings. Panel members 36 and 38 are hingedly secured together at 40 and 42 and are hingedly secured to the inside surface of side frames 12 and 14 by hinges 44 and 46. Hinge plates 48 and 50 are hingedly secured together at 52 and are hingedly secured to the lower inside surfaces of side frames 12 and 14 at 54 and 56. Horizontally disposed tubes 58 and 60 are secured to the inner ends of hinge plates 48 and 50 and slidably receive rods 62 and 64 extending therethrough. The ends of rods 62 and 64 are connected to footrest plates 66 and 68, respectively. The fact that the plates 66 and 68 are longitudinally movably mounted as well as pivotally mounted with respect to the tubes 58 and 60 permits the plates 66 and 68 to be slidably moved forwardly and rearwardly relative to the side frames and selectively pivotally moved upwardly such as the position in which plate 66 is depicted in FIG. 4.

Figure 2:
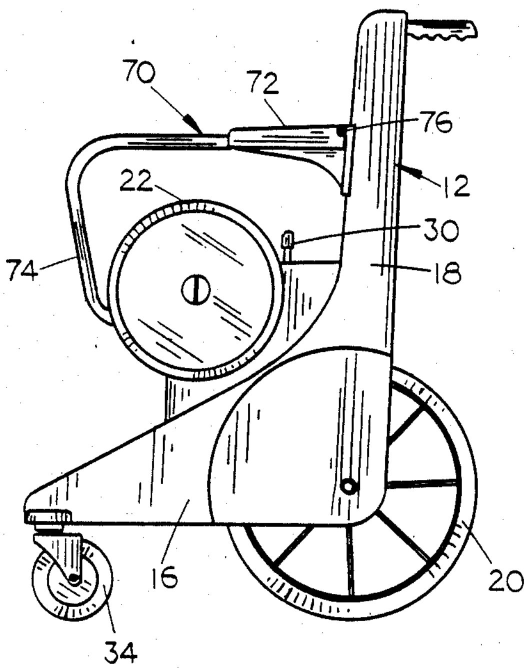
FIG. 2 is a side view of the wheelchair.
Figure 3:
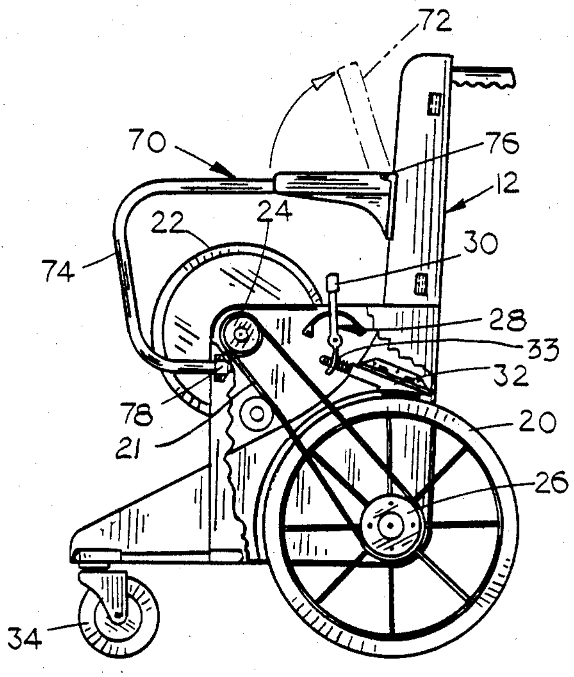
FIG. 3 is a side view of the wheelchair with portions thereof broken away to more fully illustrate the invention with the phantom lines illustrating the position to which the upper part of the armrest assembly may be pivotally moved.
Figure 5:
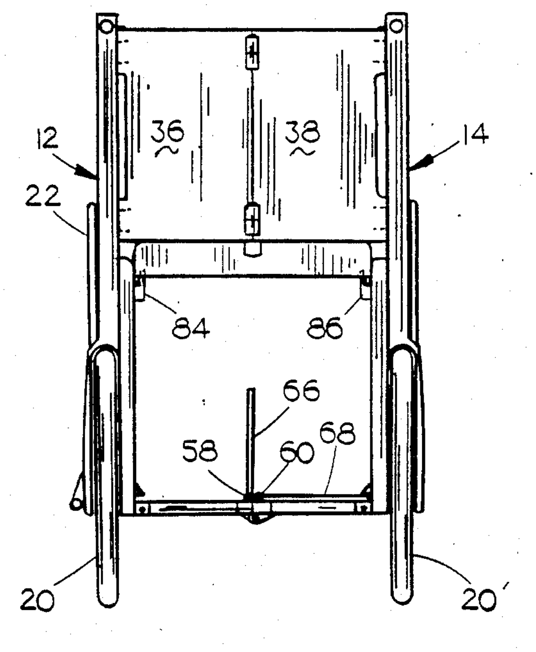
FIG. 5 is a rear view of the wheelchair of FIG. 4.

Armrest assembly 70 is mounted on side frame 12 and is comprised of armrest portions 72 and 74. Armrest portion 72 is pivotally secured to side frame 12 at 76 and normally dwells in the horizontally disposed position illustrated in FIG. 2. FIG. 3 illustrates the manner in which the armrest portion 72 may be pivotally moved upwardly. One end of armrest portion 74 is pivotally secured to side frame 12 at 78 (FIG. 3) to enable the armrest portion 74 to be moved between the positions of FIGS. 3 and 4. When the armrest portion 74 is in the position of FIG. 3, the upper rearward end is received by the groove or recess 80 in the underside of armrest portion 72. When it is desired to pivotally move the armrest portion 74 to the position of FIG. 4, armrest portion 72 is pivotally moved upwardly to disconnect the portions 72 and 74 to enable the portion 74 to be pivotally moved downwardly. When the armrest portion 74 is in the position illustrated in FIG. 1, support is still provided for the occupant's elbow while providing easy access to the hand wheels. As seen in the drawings, drive wheel 20' is mounted on side frame 14 as is hand wheel 22'. Caster wheel 34' is also mounted on side frame 14 as is armrest assembly 70'. The numeral 82 refers to a molded plastic panel member in the form of a seat which is movably received in the supports 84 and 86 secured to side frames 12 and 14 as illustrated in FIG. 5. Seat 82 is molded to fit the buttocks of the occupant and provides a much more comfortable seat for the occupant. Additionally, seat 82, when in the position of FIG. 1, maintains the wheelchair in its operative position.

When it is desired to fold or collapse the wheelchair from the position of FIG. 1 to the position of FIG. 6, seat 82 is removed and footrest plates 66 and 68 are pivotally moved upwardly. Panels 36 and 38 are then hingedly moved so that the inner ends are moved forwardly relative to each other. Hinge plates 48 and 50 are then pivotally moved upwardly as the side frames 12 and 14 are moved towards one another. When in the position of FIG. 6, the wheelchair occupies very little space and may be conveniently moved from location to location. When the wheelchair is in the position of FIG. 1, the wheelchair is very maneuverable due to the location of the drive wheels 20 and 20' and the caster wheels 34 and 34'. The wheelchair is also very stable since the drive wheels 30 are located at the juncture of the first and second side frame portions of the side frames. The mounting of the members 66 and 68 provides convenient support for the occupant's feet as desired while permitting the same to be pivotally moved upwardly so that the occupant may conveniently place his or her feet on the floor or the like.

Thus it can be seen that a novel wheelchair has been provided which accomplishes at least all of its stated objectives.

I claim:

1. A folding wheelchair, comprising:

first and second generally L-shaped side frames, each of said side frames including a first frame portion with forward and rearward ends, and a second frame portion extending upwardly from the rearward end of said first frame portion, a first back panel hingedly secured at one end to said second side frame portion of said first side frame, a second back panel hingedly secured at one end of said second side frame portion of said second side frame, said first and second panels being hingedly secured together at their other ends, the hinge connection adapted to stop hinged movement of said panels in one direction when said panels are in a generally coplanar orientation, a first generally planar hinge plate hingedly secured at one end to said first frame portion of said first frame, a second generally planar hinge plate hingedly secured at one end to said first frame portion of said second frame, said first and second hinge plates being hingedly secured together at their other ends, the hinge connection adapted to stop hinged movement of said plates in one direction when said plates are in a generally coplanar orientation, the hinge connection between said first and second frame, through said panels and plates, permitting the wheelchair to be moved between a folded inoperative position to an operative position, a first drive wheel rotatably mounted on said first side frame at the lower rearward end thereof, a second drive wheel rotatably mounted on said second side frame at the lower rearward end thereof, a first caster wheel mounted at the forward end of said first side frame portion of said first side frame, a second caster wheel mounted at the forward end of said first side frame portion of said second side frame, first and second armrest assemblies mounted on said first and second side frames, respectively, a seat means positioned between said first and second side frames, and first and second footrest assemblies mounted on said first and second hinge plates, respectively, each of said first and second footrest assemblies being independently movable between a foot supporting position and a non-supporting position while the wheelchair is in an operative position.

2. The wheelchair of claim 1 wherein said seat means is selectively removably mounted on said first and second side frames.

3. The wheelchair of claim 2 wherein said seat means comprises a molded plastic member.

4. The wheelchair of claim 1 wherein first and second hand wheels are rotatably mounted on said first and second side frames, respectively, and means connecting said first and second hand wheels with said first and second drive wheels, respectively, whereby rotation of said first hand wheel will cause rotation of said first drive wheel and whereby rotation of said second hand wheel will cause rotation of said second drive wheel.

5. The wheelchair of claim 4 wherein said connecting means comprises a drive belt means.

6. The wheelchair of claim 1 wherein a spring-loaded brake means is provided for preventing the rotation of at least one of said drive wheels.

7. The wheelchair of claim 1 wherein said footrest assemblies are positioned in a vertically disposed position closely adjacent to each other when in their said non-supporting position.

8. The wheelchair of claim 1 wherein each of said armrest assemblies comprises a normally horizontally disposed first armrest portion pivotally connected, at its rearward end, to one of said second side frame portions, and a second armrest portion which is pivotally secured to one of said side frame portions and selectively detachably secured to one of said first armrest portions.

9. The wheelchair of claim 1 wherein the rotational axis of each of said drive wheels is located at the rearward end of said first side frame portion of said side frames below said second side frame portions.

* * * * *